(12) United States Patent
Ahrens et al.

(10) Patent No.: US 6,308,289 B1
(45) Date of Patent: Oct. 23, 2001

(54) METHOD AND SYSTEM FOR ENVIRONMENTAL SENSING AND CONTROL WITHIN A COMPUTER SYSTEM

(75) Inventors: George Henry Ahrens; Mike Conrad Duron, both of Pflugerville; Robert Allan Faust, Austin; Charles Andrew McLaughlin, Round Rock; Craig Henry Shempert; Kurt Paul Szabo, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,161

(22) Filed: Oct. 1, 1998

(51) Int. Cl.$^7$ .................................................. G06F 11/00

(52) U.S. Cl. ............................................................ 714/48

(58) Field of Search ....................... 702/59, 153; 236/94; 374/152; 361/103; 710/48, 49, 50, 262; 714/47, 48

(56) References Cited

U.S. PATENT DOCUMENTS

| | | | |
|---|---|---|---|
| 5,329,625 | * | 7/1994 | Kannan ................................. 345/173 |
| 5,402,431 | * | 3/1995 | Saadeh ................................... 714/47 |
| 5,423,045 | * | 6/1995 | Kannan ................................. 713/322 |
| 5,781,434 | * | 7/1998 | Tobita ..................................... 700/79 |
| 5,835,700 | * | 11/1998 | Carbonneau ........................... 714/44 |
| 5,864,653 | * | 1/1999 | Tavallaei ............................... 315/181 |
| 6,029,251 | * | 2/2000 | Williams ............................... 713/501 |
| 6,047,380 | * | 4/2000 | Nolan .................................. 713/324 |
| 6,169,442 | * | 1/2001 | Meehan ................................ 327/713 |

OTHER PUBLICATIONS

"Interrupt Protocol for Interconnected Microprocessors-" IBM Technical Disclosure Bulletin, Jul. 1978, vol. 21, issue 2, pp. 786–787.*

* cited by examiner

Primary Examiner—Robert Beausoleil
Assistant Examiner—Bryce P. Bonzo
(74) Attorney, Agent, or Firm—Leslie A. Van Leeuwen; Bracewell & Patterson, L.L.P.

(57) ABSTRACT

In accordance with the method and system of the present invention, a local processor utilizes registers arranged in a fault/mask/cache fashion for environmental control and sensing within a data processing system. The local processor continuously reads input data from a variety of environmental sensors in order to determine if a threshold level has been reached and a fault condition exists. Cache registers allow the local processor to store/pass detailed sensor information to system firmware within system processor(s). The local processor sets a fault bit within a fault register designed to cause an interrupt to the system level firmware if any of its bits are non-zero, indicating that a fault condition has occurred. A mask register is designed to allow the interaction of both the local processor and system processor(s) when an interrupt is being serviced and help keeps track of which interrupts are being serviced and which are yet to be serviced in the case of multiple interrupt sources. The system firmware will service the interrupt and set the mask bit. The action will signal the local processor that the system has acknowledged the interrupt and will take the appropriate action. The local processor may now post another fault, exactly like the first fault, by clearing the mask bit and causing a subsequent interrupt to the system. The fault, mask, cache, and both local and system processor(s) work together to provide a positive interlock for synchronizing their actions with each other.

21 Claims, 4 Drawing Sheets

METHOD AND SYSTEM FOR ENVIRONMENTAL SENSING AND CONTROL WITHIN A COMPUTER SYSTEM

BACKGROUND OF THE INVENTION

1. Technical Field

The present invention relates in general to environmental sensing and control and in particular to a local processor using sensors for continuously monitoring environmental conditions within a data processing system. Still more particularly, the present invention relates to a local processor that utilizes registers arranged in a fault/mask/cache fashion to pass information to system firmware for environmental control and sensing within a data processing system or information handling system.

2. Description of the Related Art

Many data processing or computer systems support a standard input/output (I/O) systems conforming to the peripheral component interconnect (PCI) Local Bus architecture, an architecture supporting many complex features including I/O expansion through PCI-to-PCI bridges, peer-to-peer (device-to-device) data transfers, multi-function devices, and both integrated and plug-in devices. These input/output sub-systems may typically be set up in I/O drawer configurations, especially in large server systems having multiple I/O sub-systems. One of the complexities involved in these types of configurations is keeping the I/O drawer at the manufactures recommended operating temperatures and/or keeping enough supply power to run all the devices and operations. Even though personal computers or servers, during normal system operation, run little risk of corrupting data, the risk of data corruption becomes significant when environmental variables change (i.e. temperature) or system components (i.e. power supplies) become defective. This makes environmental sensing a very important feature.

Therefore, it would be ideal if a computer system would monitor environmental data in the background and alert its system only when a change was sensed to protect itself from data corruption. However, a problem arises when trying to bridge the localized environmental sense information of a system component to the system level where an appropriate action can be taken due to hardware and software complexities. Consequently, it would be desirable to provide a method and system for monitoring and controlling at the I/O sub-system level environmental and system component information through an arrangement of simple hardware registers common to both the system firmware and the I/O drawer processor code. The present invention solves these problems in a novel and unique fashion not previously known in the art.

SUMMARY OF THE INVENTION

It is therefore one object of the present invention to provide a method and system for environmental sensing and control for an I/O subsystem or drawer within a data processing or information handling system.

It is another object of the present invention to provide a method and system for background monitoring of environmental and system component data, which does not employ data processing system cycles until a change is sensed.

It is yet another object of the present invention to provide a method and system that causes in the case of a critical environmental condition the data processing system be alerted to perform an orderly shutdown, thereby avoiding any possibility of data corruption.

The foregoing objects are achieved as is now described. A local processor utilizes registers arranged in a fault/mask/cache fashion for environmental control and sensing within a data processing system. The local processor continuously reads input data from a variety of environmental sensors in order to determine if a threshold level has been reached and a fault condition exists. Cache registers allow the local processor to store/pass detailed sensor information to system firmware within system processor(s). The local processor sets a fault bit within a fault register designed to cause an interrupt to the system level firmware if any of its bits are non-zero, indicating that a fault condition has occurred. A mask register is designed to allow the interaction of both the local processor and system processor(s) when an interrupt is being serviced and help keeps track of which interrupts are being serviced and which are yet to be serviced in the case of multiple interrupt sources. The system firmware will service the interrupt and set the mask bit. The action will signal the local processor that the system has acknowledged the interrupt and will take the appropriate action. The local processor may now post another fault, exactly like the first fault, by clearing the mask bit and causing a subsequent interrupt to the system. The fault, mask, cache, and both local and system processor(s) work together to provide a positive interlock for synchronizing their actions with each other.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
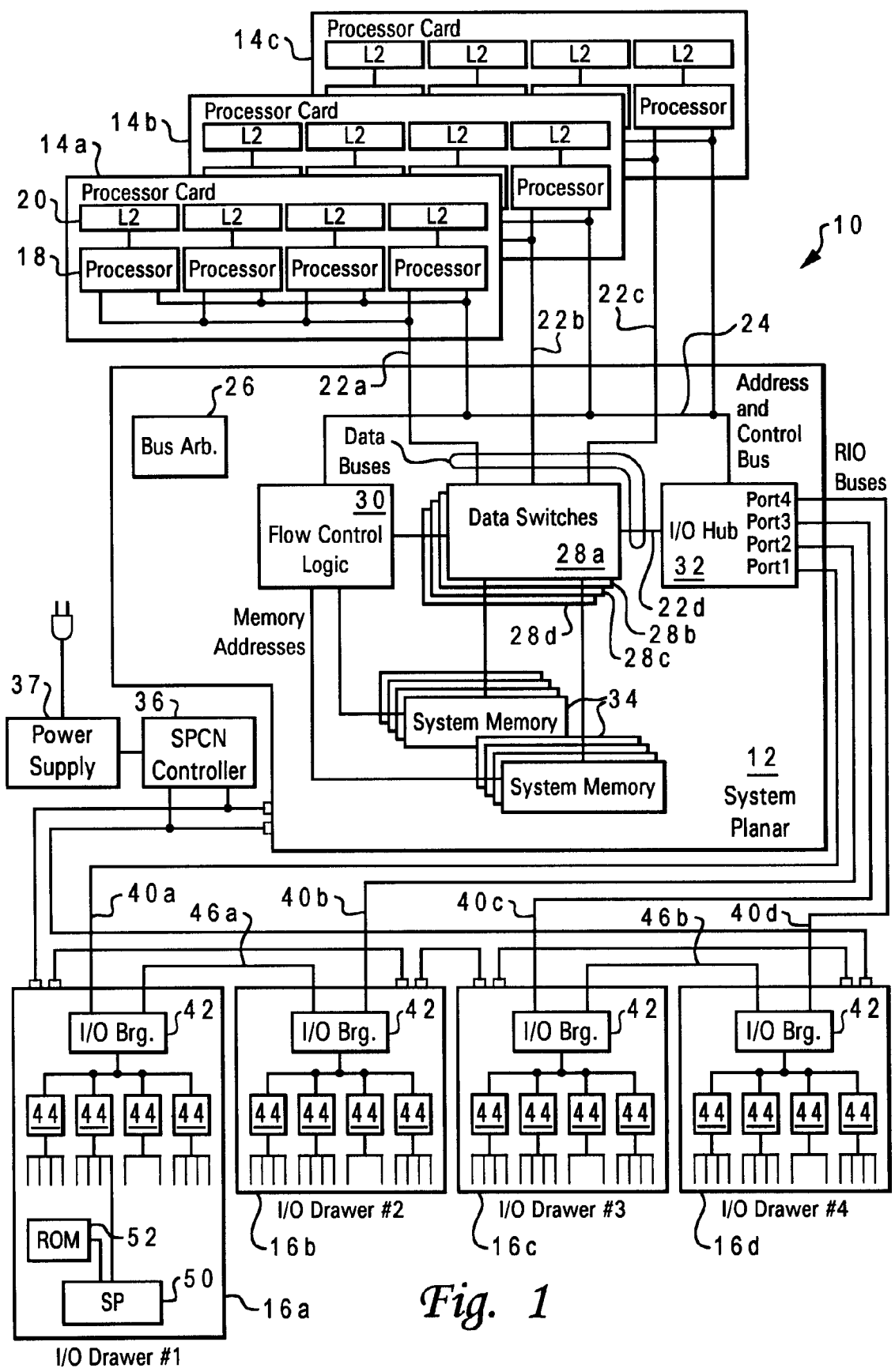
FIG. 1 depicts a block diagram of a data processing system in which a preferred embodiment of the present invention may be implemented.

With reference now to the figures and in particular with reference to FIG. 1, there is depicted a block diagram of an illustrative embodiment of a data processing system or informational handling system with which the present invention may advantageously be utilized. The illustrative embodiment depicted in FIG. 1 is a workstation or server computer system; however, as will become apparent from the following description, the present invention may also be applied to any other data processing or informational handling system.

As illustrated in FIG. 1, data processing system or informational handling system 10 includes a system planar 12 coupled to one or more processor cards (in this case processor cards 14a–14c) and one or more input/output (I/O) drawers (in this case I/O drawers 16a–16d). In the depicted embodiment, each processor card 14 carries four general purpose processors 18 that each have an on-chip level one (L1) cache (not illustrated) and an associated level two (L2) cache 20 that provide low latency storage for instructions and data. The processors 18 on each processor card 14 are all connected to address and control bus 24 and to an associated one of data buses 22a–22c.

As illustrated, system planar 12 includes a bus arbiter 26 that regulates access to address and control bus 24 by processors 18, as well as flow control logic 30 and I/O hub 32, which are each connected to address and control bus 24. Flow control logic 30 is further connected to dual-ported system memory 34 and data switches 28a–28d, and I/O hub 32 is further connected to data switches 28 by data bus 22d and to each of I/O drawers 16a–16d by a respective one of primary remote I/O (RIO) buses 40a–40d. Address transactions issued on address and control bus 24 are received by both flow control logic 30 and I/O hub 32. If an address transaction specifies an address associated with a location in system memory 34, flow control logic 30 forwards the address to system memory 34 as an access request. Alternatively, if the address transaction specifies a memory mapped I/O address associated with an I/O device contained in one of I/O drawers 16a–16d, I/O hub 32 routes the address transaction to the appropriate I/O drawer 16 via its primary RIO bus 40. Flow control logic 30 also supplies control signals to data switches 28 to control the flow of data transactions between processor cards 14 and system memory 34 and I/O hub 32.

Referring now to I/O drawers 16a–16d, each I/O drawer 16 contains an I/O bridge 42 that is directly connected to I/O hub 32 by a respective primary RIO bus 40 and is coupled either directly or indirectly to I/O hub 32 via a secondary RIO bus 46 (e.g., either secondary RIO bus 46a or 46b). That is, in embodiments of data processing system 10 in which only a single I/O drawer 16 is installed, I/O bridge 42 is directly connected to I/O hub 32 by both a primary RIO bus 40 and a secondary RIO bus 46. In other embodiments in which multiple I/O drawers 16 are installed, each I/O drawer 16 is connected to I/O hub 32 by a single primary RIO bus 40 and is connected to another I/O drawer 16 through a secondary RIO bus 46. Thus, I/O hub 32 has redundant paths through which it can communicate to each installed I/O drawer 16. Each I/O bridge 42 is connected to up to four peripheral component interconnect (PCI) bus controllers 44, which each supply connections for up to four PCI devices. As shown in FIG. 1, the PCI devices installed in I/O drawer 16a include service or local processor 50 and ROM 52. Other PCI devices that may be attached to PCI controllers 44 of I/O drawers 16a–16d include small computer system interface (SCSI) adapters, local area network (LAN) adapters, etc.

As shown, data processing system or informational handling system 10 also includes system power control network (SPCN) controller 36, which receives input power from an external power supply 37 and, following power on, sequences operating power to all the components of data processing system 10, as discussed further below. As illustrated, the system power control network includes redundant connections to I/O drawers 16, which are interconnected in a loop configuration in order to assure uninterrupted power to I/O devices installed in I/O drawers 16. Thus, as long as one of the two power connections for an I/O drawer 16 is present, I/O devices in that I/O drawer 16 will receive power.

Figure 2:
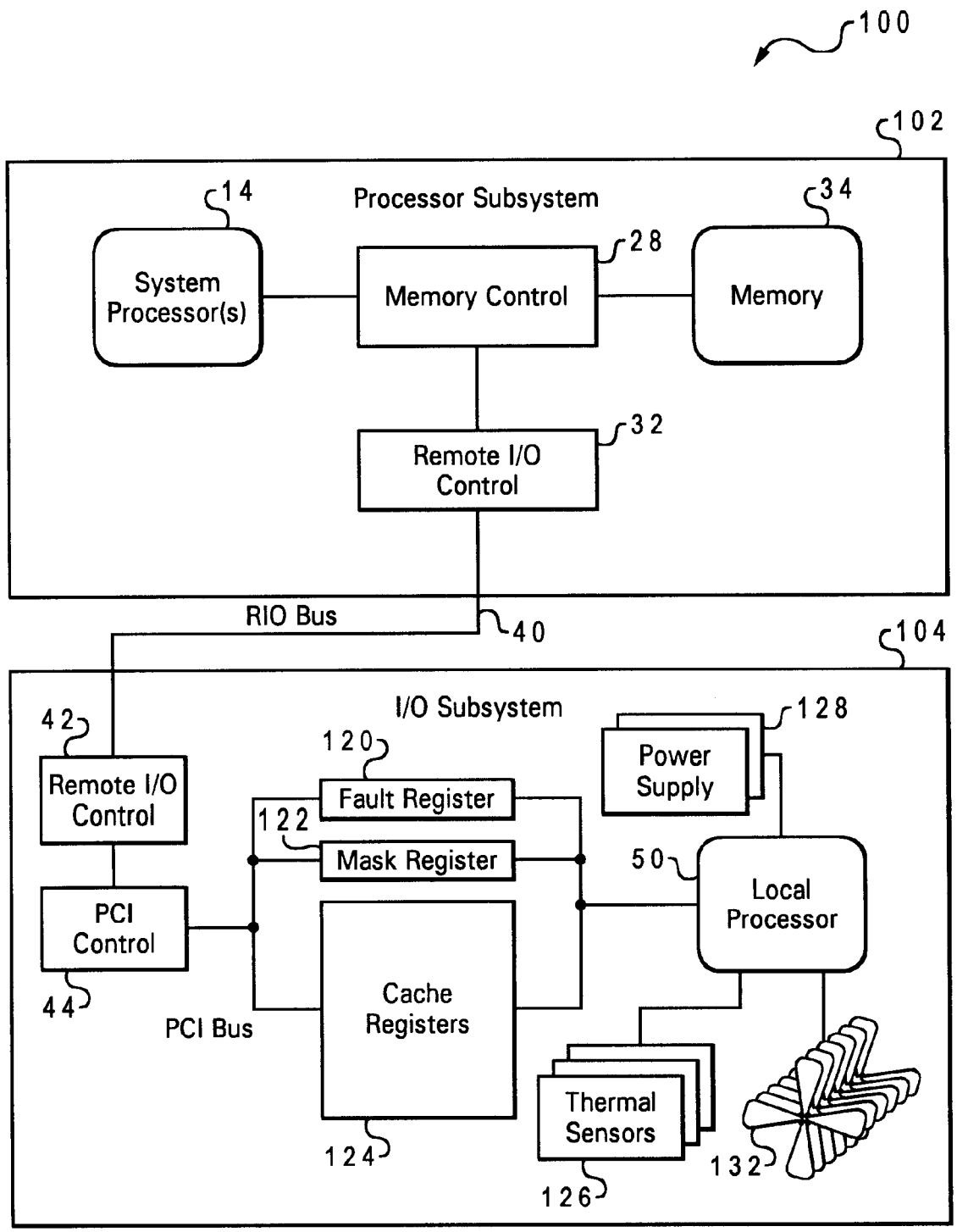
FIG. 2 is a high level block diagram of FIG. 1 of registers and sensors used in association with a local processor in accordance with a preferred embodiment of the present invention.

Referring now to FIG. 2, a high level diagram of FIG. 1 is shown depicting the registers and sensors used for environmental control in accordance with a preferred embodiment of the present invention is illustrated. As shown in FIG. 2, environmental sensing and control 100 is performed for the I/O drawer or subsystem 104, in part, by the processor sub-system 102. As was discussed and illustrated in FIG. 1, the processor sub-system 102 has one or more processors or processor cards 14 connected to system memory 34 through memory control 28. The system processor(s) are further connected to the I/O sub-system 104 through I/O controller or hub 32 onto RIO bus 40 and into the I/O sub-system's remote I/O controller 42. As, shown, the I/O controller 42 is connected to PCI bus controller 44 which is connected in turn to three different types of registers, a fault register 120, mask register 122 and cache registers 124. These three (3) register types, fault register 120, mask register 122 and cache registers 124 are in turn connected to the local or service processor 50 for use by the local processor 50 for environmental sensing and control in accordance with the present invention, as will be more fully described below.

Referring once again to FIG. 2, the local or service processor 50 in the I/O sub-system or drawer 104 is connected to a plurality of sensing devices. More specifically, the local processor 50 receives inputs from, by way of example, but not of limitation, twelve (12) sensors. As shown, the local processor 50 receives input data from sensors for seven- (7) fan(s) 132, three (3) thermal sensors 126 and two- (2) power supply sensors 128. The output from these sensors may typically include the fan(s) (not shown) rate of speed in RPM, temperature in degrees Celsius from the thermal sensor(s) 126 and power supply status codes from power supplies (not shown). For purposes of the present invention, it should be understood that FIG. 2 is not intended to depict the hardware configurations associated with the above-described sensors or that certain hardware components, such as fan(s) are set up in a primary and redundant or back-up fashion. Suffice it to say that the thermal sensors and fans are to keep the I/O sub-system or drawer at the manufacturers recommended operating temperatures and the power supplies for providing power to the I/O sub-system or drawer.

Figure 3A:
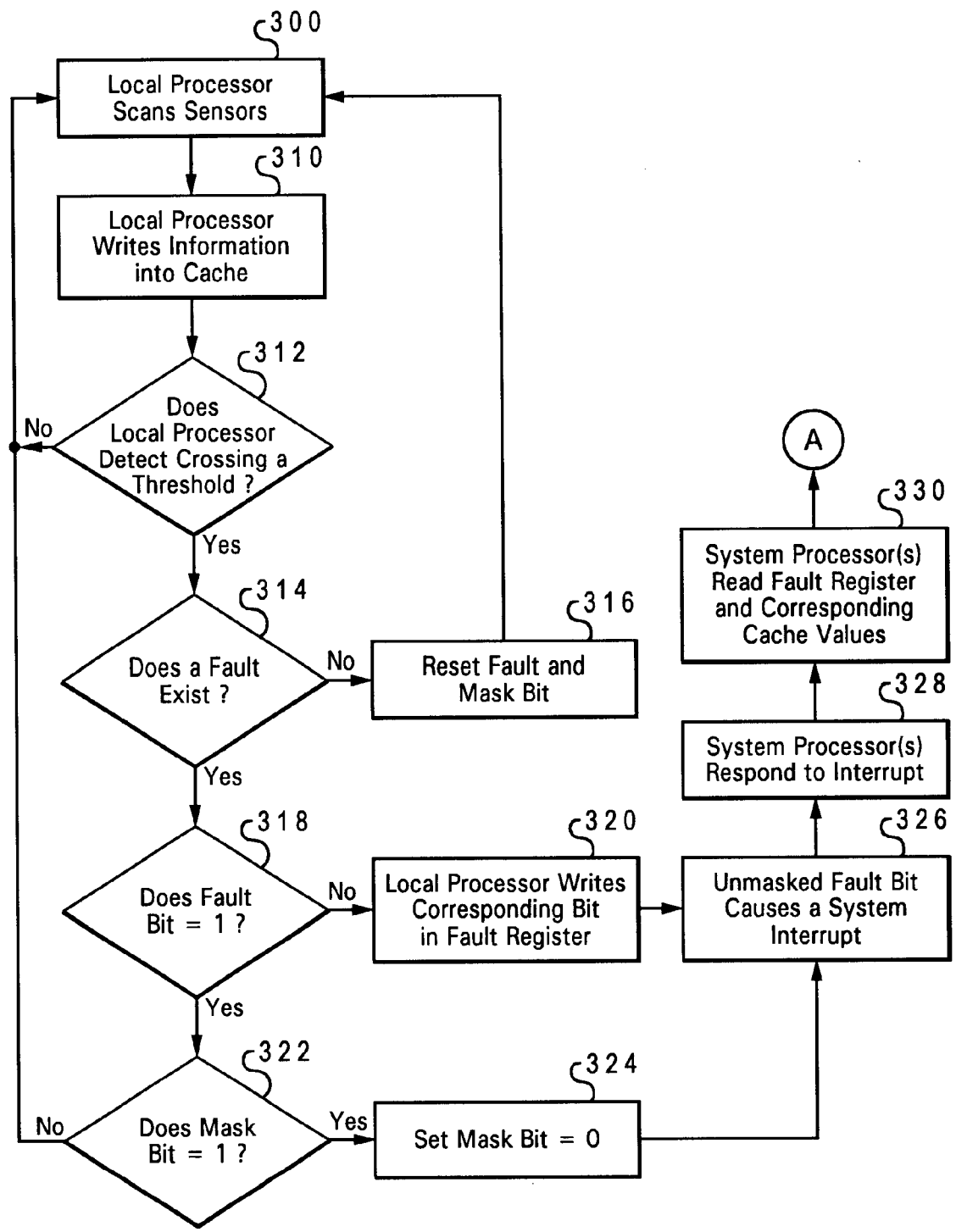
FIG. 3A depicts a high level flowchart for a process for environmental sensing and control in accordance with a preferred embodiment of the present invention.
Figure 3B:
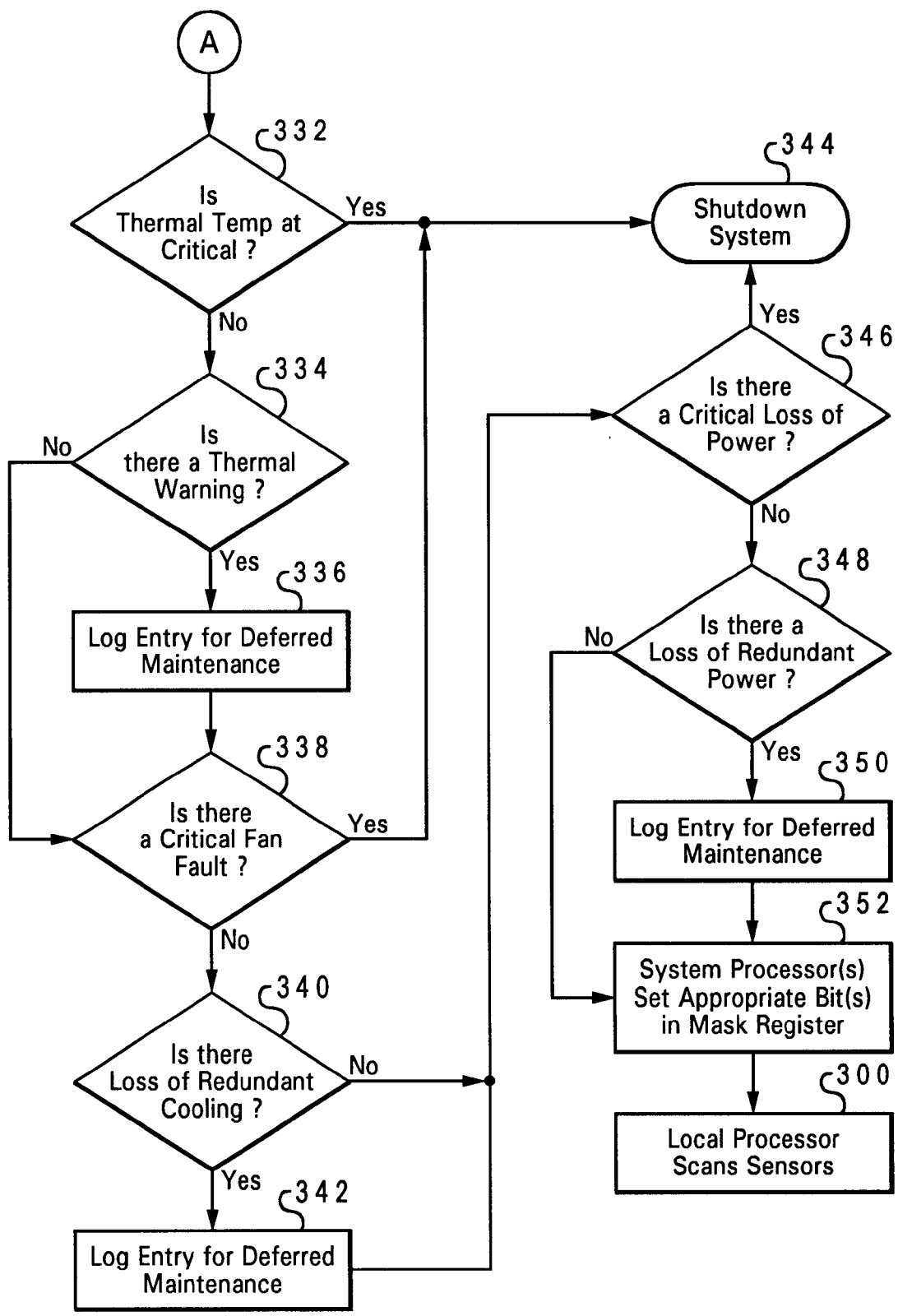
FIG. 3B is a continuation of the high level flowchart depicted in FIG. 3A.

With reference now to FIGS. 3A and 3b, a high level flowchart for a process for environmental sensing and control within a data processing system or informational handling system in accordance with the invention is depicted. The process begins at step 300, which illustrates the local processor 50 continuously scanning the sensors within the I/O sub-system or drawer 104 in a loop. The local processor 50 reads the output from the fan(s) sensors 132, thermal sensors 126 and power supply sensors 128 and continuously stores this information in designated registers (having enough byte capacity to receive the data) within the cache 124. Therefore, the local processor 50 is continuously reading and updating the sensor output data within the cache registers 124. For illustrative purposes, twelve (12) registers in the cache 124 are designated on a one for one basis for each of the sensors. As shown in step 312, after storing the sensor data into cache 124, the local processor 50 compares the most recently obtained sensor information and compares it to a "sensor" table contained within its code structure to determine if a threshold value for one or more of the sensor(s) have been crossed. In the preferred embodiment, crossing of a threshold value is either an indication that input from the sensor(s) are out of tolerance or have come back into tolerance, or that a critical level has been reached requiring sub-system shut-down. If a threshold value has not been crossed as determined by the local processor 50 based on the most recently obtained sensor data, the local processor 50 once again rescans the sensors and updates the information in cache registers 124, as shown in step 300.

Referring once again to FIG. 3A, if the local processor 50 determines that a threshold value has been crossed, the process proceeds to step 314 to determine if a fault condition exists. In accordance with a preferred embodiment of the present invention and as depicted in FIG. 2, the local processor 50 uses the fault register 120 when detecting a fault condition for causing an interrupt to the system processor(s) 14. If a threshold has been exceeded and a fault condition exists, the local processor 50 will write a separate and distinct bit into the fault register(s) 120. Therefore, there is a one to one correspondence between which fault register(s) bit(s) fired and which cache register(s) 124 has a current sensor value. A non-zero fault register(s) 120 value causes an interrupt to the system processor(s) 14 wherein the PCI control 44 accessible fault register(s) 120, and associated cache register(s) 124 is read by the system processor(s) 14 for use in servicing the interrupt, as will be more fully described below. After the system processor(s) 14 have serviced the interrupt, part of the interrupt service routine includes having the system processor(s) 14 set a mask bit in the mask register(s) 122. This will stop that particular known error event from reporting again while leaving the interrupt services active. Therefore, there is a bit in the mask register(s) 122 that corresponds with every bit in the fault register(s) 120. The act of writing to a mask register 122 is a desirable function in that it provides definite hardware/system processor/local processor interlock.

Turning once again to FIG. 3A, when the local processor 50 in step 314 determines that no fault exists, then the sensor(s) have crossed a threshold indicating that the sensor(s) have gone back into tolerance or proper range wherein the local processor 50 will reset the fault and mask bit(s), as shown in step 316 and return to scanning the sensors again, as shown in step 300. By resetting the fault and mask bit(s), the local processor 50 can once again cause the interrupt sequence again to the system processor(s) 14 if a threshold is FIG. 2, the local processor 50 uses the fault register 120 when detecting a fault condition for causing an interrupt to the system processor(s) 14. If a threshold has been exceeded and a fault condition exists, the local processor 50 will write a separate and distinct bit into the fault register(s) 120. Therefore, there is a one to one correspondence between which fault register(s) bit(s) fired and which cache register(s) 124 has a current sensor value. A non-zero fault register(s) 120 value causes an interrupt to the system processor(s) 14 wherein the PCI control 44 accessible fault register(s) 120, and associated cache register(s) 124 is read by the system processor(s) 14 for use in servicing the interrupt, as will be more fully described below. After the system processor(s) 14 have serviced the interrupt, part of the interrupt service routine includes having the system processor(s) 14 set a mask bit in the mask register(s) 122. This will stop that particular known error event from reporting again while leaving the interrupt services active. Therefore, there is a bit in the mask register(s) 122 that corresponds with every bit in the fault register(s) 120. The act of writing to a mask register 122 is a desirable function in that it provides definite hardware/system processor/local processor interlock.

Turning once again to FIG. 3A, when the local processor 50 in step 314 determines that no fault exists, then the sensor(s) have crossed a threshold indicating that the sensor(s) have gone back into tolerance or proper range wherein the local processor 50 will reset the fault and mask bit(s), as shown in step 316 and return to scanning the sensors again, as shown in step 300. By resetting the fault and mask bit(s), the local processor 50 can once again cause the interrupt sequence again to the system processor(s) 14 if a threshold is again crossed and a fault condition exists. As shown in step 318, if fault condition(s) exists, then the local processor 50 must check to see if the appropriate fault bit(s) are set. It should be noted that in accordance with the present invention, there would never be a condition where a mask bit is set and the fault bit is not set. As shown in step 320, the local processor 50 writes the corresponding bit in the fault register 120 when the fault bit in step 318 is equal to zero and proceeds to step 326 to cause a system interrupt. However, if the fault bit is equal to one the process proceeds to step 324 wherein the local processor 50 checks to see if the mask bit is equal to one. The mask bit being equal to zero indicates that the system processor(s) 14 have not yet serviced a previous interrupt thereby forcing the local processor 50 to restart the cycle of scanning the sensor(s), as shown in step 300, until the system processor(s) 14 complete the service interrupt routine and set the mask bit equal to one. If the mask bit is equal to one, the system interrupt routine is complete and as shown in step 332, the local processor 50 sets the mask bit equal to zero thereby causing the unmasked fault bit to cause a system interrupt, shown in step 326.

Referring now to FIGS. 3A and 3B, after the unmasked fault bit in step 326 causes a system interrupt, the system processor(s) 14 respond to the interrupt as shown in step 328. The process proceeds to step 330 wherein the system processor(s) 14 read the bit(s) in the fault register 120 and corresponding cache register 124 values to determine what kind of fault condition exists and take the appropriate action. By way of example, the process then passes to step 332, which illustrates the system processor(s) 14 determining whether one, two or all three of the thermal sensors 126 indicates that the fault condition is at a critical temperature level. If a critical temperature level exists, the system processor(s) 14 shutdown the system 10, as shown in step 344, for correction of the problem at a later time. If the temperature is not critical, the process proceeds to step 334, wherein the system processor(s) 14 determine if the threshold crossed is an indication of a thermal warning. If a thermal warning is indicated, the system processor(s) log an entry in memory to be reviewed during a deferred maintenance period by service personnel, as shown in step 336. If there is no thermal warning the process then proceeds to step 338 to check another set of sensor readings.

Referring now to FIG. 3B, the process proceeds to step 338 wherein once again, the system processor(s) 14 read the bit(s) in the fault register 120 and corresponding cache register 124 values to determine what kind of fault condition exists. Step 338, illustrates the system processor(s) 14 determining whether any of the seven (7) fan sensors 132 indicates that there is a critical fan fault condition. If a critical fan fault condition exists, the system processor(s) 14 once again shutdown the system 10, as shown in step 344, for correction of the problem at a later time. If the fan fault is not critical, the process proceeds to step 342, wherein the system processor(s) 14 determine if the threshold crossed is an indication of a loss of redundant cooling. If a loss of redundant cooling is indicated, the system processor(s) 14 log an entry in memory to be reviewed during a deferred maintenance period by service personnel, as shown in step 342. If there is no loss of redundant cooling, the process then proceeds to step 346 to check another set of sensor readings.

As shown in step 346, the system processor(s) 14 next determine whether one or both of the power supply sensors 128 indicates that there is a critical loss of power. If a critical loss of power fault condition exists, the system processor(s) 14 once again shutdown the system 10, as shown in step 344, for correction of the problem at a later time. If the power loss is not critical, the process proceeds to step 348, wherein the system processor(s) 14 determine if the threshold crossed is an indication of a loss of redundant power. If a loss of redundant power is indicated, the system processor(s) 14 log an entry in memory to be reviewed during a deferred maintenance period by service personnel, as shown in step 350. If there is no loss of redundant power, the process then proceeds to step 352 wherein the system processor(s) 14 set the appropriate bit(s) in the mask register(s) 122 indicating that the service routine is finished. The process then proceeds to step 300 wherein the local processor 50 is continuously scanning sensors as described above.

By way of example, but not of limitation, a thermal excursion will be described to illustrate the methodology of the present invention. When the temperature first starts rising and reaches the warning value, the local processor 50 will set the appropriate fault register bit. The system firmware within the system processor(s) 14 will now read the fault register and set the appropriate mask bit for that sensor. The system firmware would then read the cached sensor value and compare it against the warning and critical value to determine that a warning state had been reached. At this point one of two events would occur. In the first event, the temperature value drops below the defined warning value in which case the local processor 50 would clear the mask bit and the fault bit indicating that the value is now back in tolerance. If a subsequent rise in temperature occurs, the local processor 50 once again sets the fault register bit and the system firmware responds accordingly. In the second event, the temperature elevates past the defined critical value. In this case the local processor 50 would keep the fault register bit set, but would clear the mask bit which would allow the system firmware to be invoked to service the interrupt again. This time the system firmware would again set the mask bit and read the actual sensor value, compare it against the warning and critical value to determine that the critical state had been reached. In either case, the local processor will either reset the fault Register bit and the mask register bit indicating that the present condition is now cleared or will reset only the mask bit indicating that a new fault level has been reached.

The present invention provides for a local processor that performs multiple reads to determine if an environmental threshold level has been changed. The method of the present further provides a firmware filter that avoids false triggering of a system interrupt. The System firmware analyzes the information presented to it, classifies it, and presents the value to the operating system for appropriate action based on the classification. The method and system of the present invention is unique in that interlocking and synchronization is accomplished by hardware registers arranged in a fault/mask/cache system.

It is also important to note that although the present invention has been described in the context of a fully functional environmental sensing and control system, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method of environmental sensing and control for one or more devices having associated sensors within a computer system, comprising the steps of:

receiving, by a local processor, environmental sensor inputs from one or more devices through associated one or more sensors;

writing said environmental sensor inputs into a register on said local processor;

determining if a threshold level has been crossed from said associated one or more sensors;

responsive to determining that one or more threshold levels have been crossed, determining if a fault condition exists for said one or more devices;

responsive to determining that one or more fault conditions exists, said local processor checking one or more bits for causing an interrupt for servicing said one or more fault conditions by one or more system processors; and responsive to determining that said one or more fault conditions no longer exist, resetting said one or more bits.

2. The method of claim 1, wherein said register is a cache register.

3. The method of claim 1, wherein said checking one or more bits includes checking one or more fault bits and one or more mask bits.

4. The method of claim 3, further comprising:

responsive to checking said one or more fault bits, setting said one or more fault bits to corresponding said one or more fault conditions for causing said interrupt.

5. The method of claim 4, further comprising:

responsive to checking said one or more mask bits, resetting said one or more mask bits to corresponding said one or more fault conditions for causing said interrupt.

6. The method of claim 4, further comprising:

responsive to checking said one or more mask bits, scanning said sensors by said local processor when said one or more mask bits are not set to corresponding said one or more fault bits that are set.

7. The method of claim 3, further comprising:

reading said one or more fault bits and corresponding said cache register values by said system processors for servicing said one or more fault conditions.

8. The method of claim 7, further comprising:

shutting down a computer system by said system processors when a critical environmental condition is indicated by said cache register values.

9. The method of claim 7, further comprising:

logging an entry for deferred maintenance for a computer sub-system by said system processors when an environmental warning condition is indicated by said cache register values.

10. The method of claim 7, further comprising:

setting said one or more mask bits to corresponding said one or more fault bits by said system processors after servicing said one or more fault conditions.

11. An information handling system, comprising:

means for receiving, by a local processor, environmental sensor inputs from one or more devices through associated one or more sensors;

means for writing said environmental sensor inputs into a register on said local processor;

means for determining if one or moret threshold levels have been crossed from said associated one or more sensors;

means for determining if one or more fault conditions exists for said one or more threshold levels;

means for checking said one or more bits by said local processor for causing an interrupt for servicing said one or more fault conditions by one or more system processors; and means for resetting said one or more bits when said one or more fault conditions no longer exist.

12. An information handling system according to claim 11, wherein said register is a cache register.

13. An information handling system according to claim 11, wherein said means for checking one or more bits includes means for checking one or more fault bits and one or more mask bits.

14. An information handling system according to claim 13, further comprising:

means for setting said one or more fault bits to corresponding said one or more fault conditions for causing said interrupt.

15. An information handling system according to claim 14, further comprising:

means for resetting said one or more mask bits to corresponding said one or more fault conditions for causing said interrupt.

16. An information handling system according to claim 14, further comprising:

means for determining when said one or more mask bits are not set to corresponding said one or more fault bits that are set for scanning said sensors by said local processor.

17. An information handling system according to claim 13, further comprising:

means for reading said one or more fault bits and corresponding said cache register values by said system processors for servicing said one or more fault conditions.

18. An information handling system according to claim 17, further comprising:

means for shutting down a computer system by said system processors when a critical environmental condition is indicated by said cache register values.

19. An information handling system according to claim 17, further comprising:

means for logging an entry for deferred maintenance for a computer sub-system by said system processors when an environmental warning condition is indicated by said cache register values.

20. An information handling system according to claim 17, further comprising:

means for setting said one or more mask bits to corresponding said one or more fault bits by said system processors after servicing said one or more fault conditions.

21. A computer program product residing on a computer usable medium for providing environmental control and sensing to an information handling system, comprising:

instruction means for receiving, by a local processor, environmental sensor inputs from one or more devices through associated one or more sensors;

writing said environmental sensor inputs into said cache register;

instruction means for determining if one or more threshold levels have been crossed from said associated one or more sensors;

instruction means for determining if one or more fault conditions exists for said one or more threshold levels;

instruction means for checking one or more bits by said local processor for causing an interrupt for servicing said one or more fault conditions by one or more system processors; and instruction means for resetting said one or more bits when said one or more fault conditions no longer exist.

* * * * *

UNITED STATES PATENT AND TRADEMARK OFFICE
CERTIFICATE OF CORRECTION

PATENT NO. : 6,308,289 B1
DATED : October 23, 2001
INVENTOR(S) : Ahrens et al.

Page 1 of 1

It is certified that error appears in the above-identified patent and that said Letters Patent is hereby corrected as shown below:

<u>Column 9,</u>
Line 7, delete the word "moret" and replace it with the word -- more --.

Signed and Sealed this

Twenty-first Day of May, 2002

Attest:

Attesting Officer

JAMES E. ROGAN
*Director of the United States Patent and Trademark Office*